United States Patent
Ito

(10) Patent No.: US 9,337,760 B2
(45) Date of Patent: May 10, 2016

(54) ALTERNATOR CONTROL APPARATUS

(75) Inventor: Takahiro Ito, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/414,955

(22) PCT Filed: Aug. 10, 2012

(86) PCT No.: PCT/JP2012/070539
§ 371 (c)(1),
(2), (4) Date: Jan. 15, 2015

(87) PCT Pub. No.: WO2014/024317
PCT Pub. Date: Feb. 13, 2014

(65) Prior Publication Data
US 2015/0171782 A1    Jun. 18, 2015

(51) Int. Cl.
| | |
|---|---|
| H02P 11/00 | (2006.01) |
| H02H 7/06 | (2006.01) |
| H02P 9/00 | (2006.01) |
| H02P 9/04 | (2006.01) |
| H02J 7/14 | (2006.01) |
| H02P 9/48 | (2006.01) |
| H02K 11/00 | (2006.01) |
| H02P 101/45 | (2015.01) |

(52) U.S. Cl.
CPC ... H02P 9/04 (2013.01); H02J 7/14 (2013.01); H02P 9/48 (2013.01); *H02P 2101/45* (2015.01)

(58) Field of Classification Search
USPC .................. 322/24, 28, 99; 701/22; 307/10.1
See application file for complete search history.

(56) References Cited

U.S. PATENT DOCUMENTS

| | | | | | |
|---|---|---|---|---|---|
| 4,084,126 | A | * | 4/1978 | Clements | H02J 7/1438 219/202 |
| 4,306,184 | A | * | 12/1981 | Iwaki | H02H 7/065 322/28 |
| 4,336,487 | A | * | 6/1982 | Tanaka | H02J 7/1461 322/28 |
| 4,362,982 | A | * | 12/1982 | Akita | H02J 7/163 320/123 |
| 4,379,990 | A | * | 4/1983 | Sievers | G01R 31/007 320/123 |
| 4,670,705 | A | * | 6/1987 | Sievers | H02J 7/163 322/28 |
| 5,334,926 | A | * | 8/1994 | Imaizumi | H02J 7/1423 307/16 |
| 5,418,401 | A | * | 5/1995 | Kaneyuki | H02J 7/1423 307/10.1 |
| 5,521,486 | A | * | 5/1996 | Takamoto | H02J 7/1461 322/28 |

(Continued)

FOREIGN PATENT DOCUMENTS

| | | |
|---|---|---|
| JP | 2009-161148 | 7/2009 |
| JP | 2009-214830 | 9/2009 |

*Primary Examiner* — Pedro J Cuevas
(74) *Attorney, Agent, or Firm* — Finnegan, Henderson, Farabow, Garrett & Dunner, LLP

(57) ABSTRACT

An alternator control apparatus includes a first controller that controls an alternator; and a second controller that transmits an instruction signal to the first controller at a first predetermined cycle, the instruction signal being related to electric power generation of the alternator, wherein the first controller controls the alternator such that an amount of the electric power generated by the alternator is greater than 0, if the first controller does not receive the instruction signal from the second controller over a predetermined time period that is longer than the first predetermined cycle, and the second controller stops transmitting the instruction signal over the predetermined time period, if the second controller determines that the instruction signal from the second controller is received at the first controller as an abnormal instruction signal that does not meet a predetermined communication specification.

9 Claims, 4 Drawing Sheets

(56) References Cited

U.S. PATENT DOCUMENTS

| | | | | |
|---|---|---|---|---|
| 5,581,172 A * | 12/1996 | Iwatani | H02J 7/1446 | 322/24 |
| 5,646,599 A * | 7/1997 | Adachi | H02J 7/1461 | 322/28 |
| 6,496,109 B1 * | 12/2002 | Guzick, Jr. | H02J 7/1461 | 340/450.3 |
| 6,580,180 B2 * | 6/2003 | Tamai | H02J 7/1423 | 307/10.1 |
| 6,614,207 B2 * | 9/2003 | Maehara | H02P 9/305 | 322/24 |
| 6,781,350 B1 * | 8/2004 | Iwatani | H02J 7/244 | 322/17 |
| 7,268,441 B2 * | 9/2007 | Asao | H02P 9/305 | 318/400.09 |
| 7,521,905 B2 * | 4/2009 | Welchko | H02J 7/1461 | 322/37 |
| 8,200,385 B2 * | 6/2012 | Ando | B60K 1/02 | 180/65.265 |
| 8,577,527 B2 * | 11/2013 | Fukumura | B60W 40/12 | 123/179.3 |
| 8,841,889 B2 * | 9/2014 | Tisserand | H02J 7/1461 | 322/28 |
| 8,952,564 B2 * | 2/2015 | Kamichi | B60L 3/003 | 307/10.1 |
| 2001/0035685 A1 * | 11/2001 | Tamai | H02J 7/1423 | 307/10.1 |
| 2003/0058507 A1 * | 3/2003 | Oomori | H04B 10/504 | 398/177 |
| 2005/0135133 A1 | 6/2005 | Maehara | | |
| 2009/0183033 A1 | 7/2009 | Ando | | 714/43 |
| 2009/0319109 A1 * | 12/2009 | Ando | B60K 1/02 | 701/22 |
| 2010/0174431 A1 * | 7/2010 | Fukumura | B60W 40/12 | 701/22 |
| 2010/0268406 A1 * | 10/2010 | Ito | B60L 3/0023 | 701/22 |
| 2012/0065828 A1 * | 3/2012 | Kato | B60K 6/445 | 701/22 |
| 2012/0187759 A1 * | 7/2012 | Kamichi | B60L 3/003 | 307/10.1 |
| 2013/0174806 A1 * | 7/2013 | Nagakura | F02B 17/005 | 123/296 |
| 2013/0211692 A1 * | 8/2013 | Asami | B60W 20/00 | 701/103 |
| 2013/0274977 A1 * | 10/2013 | Fushiki | B60W 20/108 | 701/22 |
| 2015/0019057 A1 * | 1/2015 | Morisaki | B60L 7/18 | 701/22 |
| 2015/0171782 A1 * | 6/2015 | Ito | H02P 9/04 | 322/24 |
| 2015/0291059 A1 * | 10/2015 | Kawasaki | B60L 15/20 | 701/22 |
| 2015/0303853 A1 * | 10/2015 | Ito | H02P 9/04 | 322/28 |
| 2015/0306966 A1 * | 10/2015 | Ichikawa | B60L 11/123 | 701/22 |
| 2015/0336523 A1 * | 11/2015 | Okaniwa | B60R 16/0307 | 307/10.6 |
| 2015/0336565 A1 * | 11/2015 | Yamazaki | B60K 6/442 | 701/22 |
| 2015/0343904 A1 * | 12/2015 | Ikeyama | B60L 3/0007 | 701/22 |
| 2015/0353075 A1 * | 12/2015 | Futatsudera | B60K 6/442 | 701/22 |

* cited by examiner

ALTERNATOR CONTROL APPARATUS

CROSS-REFERENCE TO RELATED APPLICATIONS

This application is a national phase application of International Application No. PCT/JP2012/070539, filed Aug. 10, 2012, the content of which is incorporated herein by reference.

TECHNICAL FIELD

A power generation control apparatus is known which includes a charge control ECU and an alternator ECU that are connected via a LIN communication line. The alternator ECU, in a state where information cannot be acquired normally via the LIN communication line from the charge control ECU, performs power generation control of the alternator based on the information on a State Of Battery stored in a data holding unit of the alternator ECU and a battery voltage acquired by a sensor value acquisition unit of the alternator ECU (see Patent Document 1, for example).

BACKGROUND ART

[Patent Document 1] Japanese Laid-open Patent Publication No 2009-214830

DISCLOSURE OF INVENTION

Problem to be Solved by Invention

According to such a configuration as disclosed in Patent Document 1 that has concerted control of the alternator with two controllers that are connected via a communication bus, there may be a case where an instruction signal from a master controller is not normally received by a slave controller. Even in such a case, it is necessary to appropriately maintain the power generation control for the alternator.

In order to solve the problem with the configuration disclosed in Patent Document 1, it becomes necessary for the alternator ECU, which is a slave controller, to have a special function for an abnormal communication event.

Therefore, an object of the present invention is to provide an alternator control apparatus that capable of appropriately controlling an alternator even at the time of an abnormal communication event without being equipped with a special function.

Means to Solve the Problem

According to an aspect of the present invention an alternator control apparatus is provided, which includes a first controller that controls an alternator; and a second controller that transmits an instruction signal to the first controller at a first predetermined cycle, the instruction signal being related to electric power generation of the alternator, wherein the first controller controls the alternator such that an amount of the electric power generated by the alternator is greater than 0, if the first controller does not receive the instruction signal from the second controller over a predetermined time period that is longer than the first predetermined cycle, and the second controller stops transmitting the instruction signal over the predetermined time period, if the second controller determines that the instruction signal from the second controller is received at the first controller as an abnormal instruction signal that does not meet a predetermined communication specification.

Advantage of the Invention

According to the present invention, an alternator control apparatus can be obtained which is capable of appropriately controlling an alternator even at the time of an abnormal communication event.

BEST MODE FOR CARRYING OUT THE INVENTION

In the following, the best mode for carrying out the present invention will be described in detail by referring to the accompanying drawings.

Figure 1:
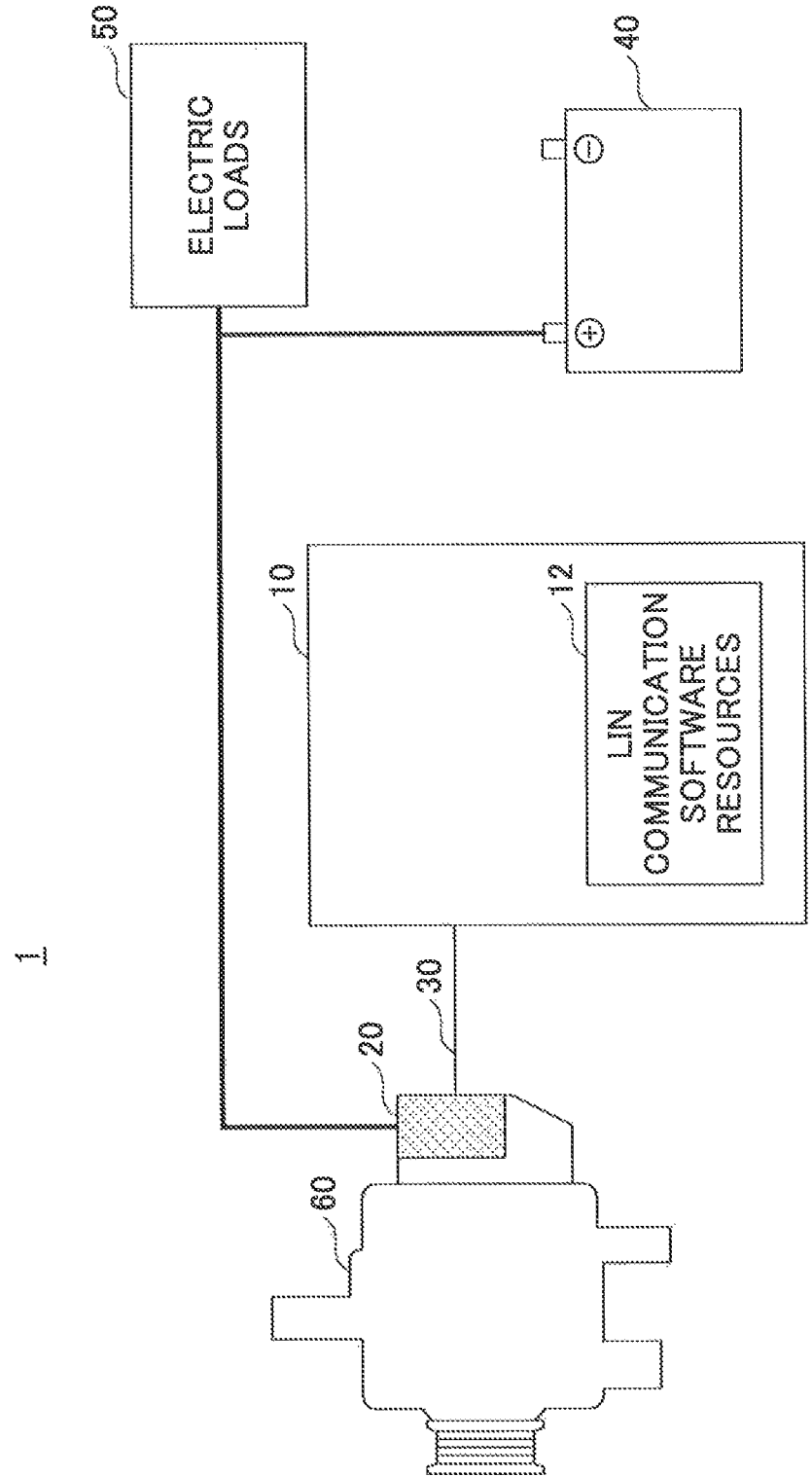
FIG. 1 is a diagram illustrating a main configuration of an alternator control apparatus 1 according to an embodiment.

FIG. 1 is a diagram illustrating a main configuration of an alternator control apparatus 1 according to an embodiment. The alternator control apparatus 1 controls an alternator 60. It is noted that the alternator 60 is coupled to an engine (not illustrated) and generates electric power based on rotation of the engine. The electric power generated by the alternator 60 is consumed by various electric loads 50 (a blower motor, a wiper, etc.,) of a vehicle. Further, the electric power generated by the alternator 60 may be utilized to charge a battery 40 installed in the vehicle.

The alternator control apparatus includes an ECU (Electronic Control Unit) 10 and an LIN (Local Interconnect Network) regulator 20, as illustrated in FIG. 1. The ECU 10 and the LIN regulator 20 are connected via a LIN bus (LIN communication bus) 30. The ECU 10 and the LIN regulator 20 communicate with each other based on a LIN protocol. The LIN protocol is of a master/slave type in which the ECU 10 functions as a master and the LIN regulator 20 functions as a slave. It is noted that another slave controller, in addition to the LIN regulator 20, may be connected to the ECU 10.

The ECU 10 may include a microprocessor that includes a CPU, a ROM, a RAM, etc., which are interconnected via buses (not illustrated). A storage device 12 such as a ROM has LIN communication software resources stored therein. It is noted that the ECU 10 may be implemented by an arbitrary ECU such as an ECU that controls an engine.

The ECU 10 generates an instruction signal related to electric power generation by the alternator 60, and transmits the instruction signal to the LIN regulator 20 via the LIN bus 30. The instruction signal related to electric power generation by the alternator 60 may be any types of signals that instruct a target value with respect to an amount of to be the electric power generated by the alternator 60. For example, the instruction signal may instruct the target value of an output voltage (generated voltage) of the alternator 60. The ECU 10, in a normal scheduling state (except for an instruction signal stop state and a return process execution state), transmits the instruction signal to the LIN regulator 20 at a first predetermined cycle T1.

It is noted that a way of determining the target value related to the electric power generation by the alternator 60 may be arbitrary. In general, the generated voltage of the alternator 60 is controlled optimally according to a vehicle travel state. For example, in order to reduce a load on the engine due to the power generation by the alternator 60, the generated voltage is reduced in an idling state of the vehicle or a travel state with constant speed, and the generated voltage is increased in a decelerated state of the vehicle. Further, in an accelerated state of the vehicle, the generated voltage of the alternator 60 may be adjusted such that an accumulated value of an input/output current of the battery 40 follows a predetermined target value.

The ECU 10 stops transmitting the instruction signal if the ECU 10 continuously receives a communication abnormality flag described hereinafter from the LIN regulator 20. Specifically, if the ECU 10 continuously receives the communication abnormality flag from the LIN regulator 20, the transmission of the instruction signal from the ECU 10 to the LIN regulator 20 at the first predetermined cycle T1 is stopped (out of the normal scheduling). A time period during which the transmission of the instruction signal is stopped is set to cause a timeout of the LIN regulator 20 described hereinafter. A technical meaning of the transmission of the instruction signal is described hereinafter.

The ECU 10 may start the transmission of the instruction signal again, after the ECU 10 stops the transmission of the instruction signal to cause the timeout of the LIN regulator 20 described hereinafter. In this case, the transmission of the instruction signal may be performed at a second predetermined cycle T2. The second predetermined cycle T2 may be the same as the first predetermined cycle T1; however, the second predetermined cycle T2 is preferably set such that the second predetermined cycle T2 is longer than the first predetermined cycle T1.

The ECU 10 may restore the transmission cycle of the instruction signal from the second predetermined cycle T2 to the first predetermined cycle T1 (an ordinary cycle, that is to say, the normal scheduling), if the ECU 10 does not receive the communication abnormality flag from the LIN regulator 20 in response to the instruction signal transmitted at the second predetermined cycle T2. In this case, the ECU 10 may restore the transmission cycle of the instruction signal from the second predetermined cycle T2 to the first predetermined cycle T1, if a state, in which the ECU 10 does not receive the communication abnormality flag from the LIN regulator 20 in response to the instruction signal transmitted at the second predetermined cycle T2, continues.

The LIN regulator 20 may be formed of an IC (Integrated Circuit). The LIN regulator 20 may have a specification which Verband der Deutschen Automobilindustrie (VDA) promotes to unify. For example, the LIN regulator 20 may be a TLE8880 commercially produced by Infineon or a CR665 commercially produced by Bosch, etc., that meet such a regulator specification. The LIN regulator 20 may be incorporated in a body of the alternator 60, as schematically illustrated in FIG. 1.

The LIN regulator 20 receives the instruction signal from the ECU 10 via the LIN bus 30. If the LIN regulator 20 receives the instruction signal, which does not meet a predetermined communication specification, from the ECU 10, the LIN regulator 20 rejects the instruction signal as an abnormal instruction and recognizes an instruction value (previous value) based on a normal instruction signal received previously from the ECU 10 as a correct instruction value. It is noted that the instruction signal which does not meet a predetermined communication specification may be an instruction signal that causes a check sum error, a parity error, a framing error, a synch field error, etc., for example. Further, in the case of the LIN protocol, the instruction signal which does not, meet a predetermined communication specification is received but rejected as an abnormal instruction signal at the LIN regulator 20 that complies with the LIN protocol.

If the LIN regulator 20 cannot continuously receive the instruction signal from the ECU 10 for a predetermined time (3 s, for example) (i.e., the instruction signal from the ECU 10 does not come continuously for the predetermined time), timeout occurs, which causes the LIN regulator 20 to change to an autonomous power generation state described hereinafter. It is noted that, before the timeout, the LIN regulator 20 controls the alternator 60 based on the instruction value (previous value) of the normal instruction signal received previously.

The LIN regulator 20 transmits a response signal from the ECU 10 via the LIN bus 30. For example, the LIN regulator 20 transmits the communication abnormality flag as the response signal to the ECU 10. The communication abnormality flag may be a signal (flag) for reporting to the ECU 10 a fact that the LIN regulator 20 receives the instruction signal, which does not meet the communication specification, from the ECU 10 (and thus the LIN regulator 20 operates in a state in which the previous value is held), as described above. The communication abnormality flag is transmitted as the response signal from the LIN regulator 20 to the ECU 10 every time when the LIN regulator 20 receives the instruction signal, which does not meet the communication specification, from the ECU 10.

Figure 2:
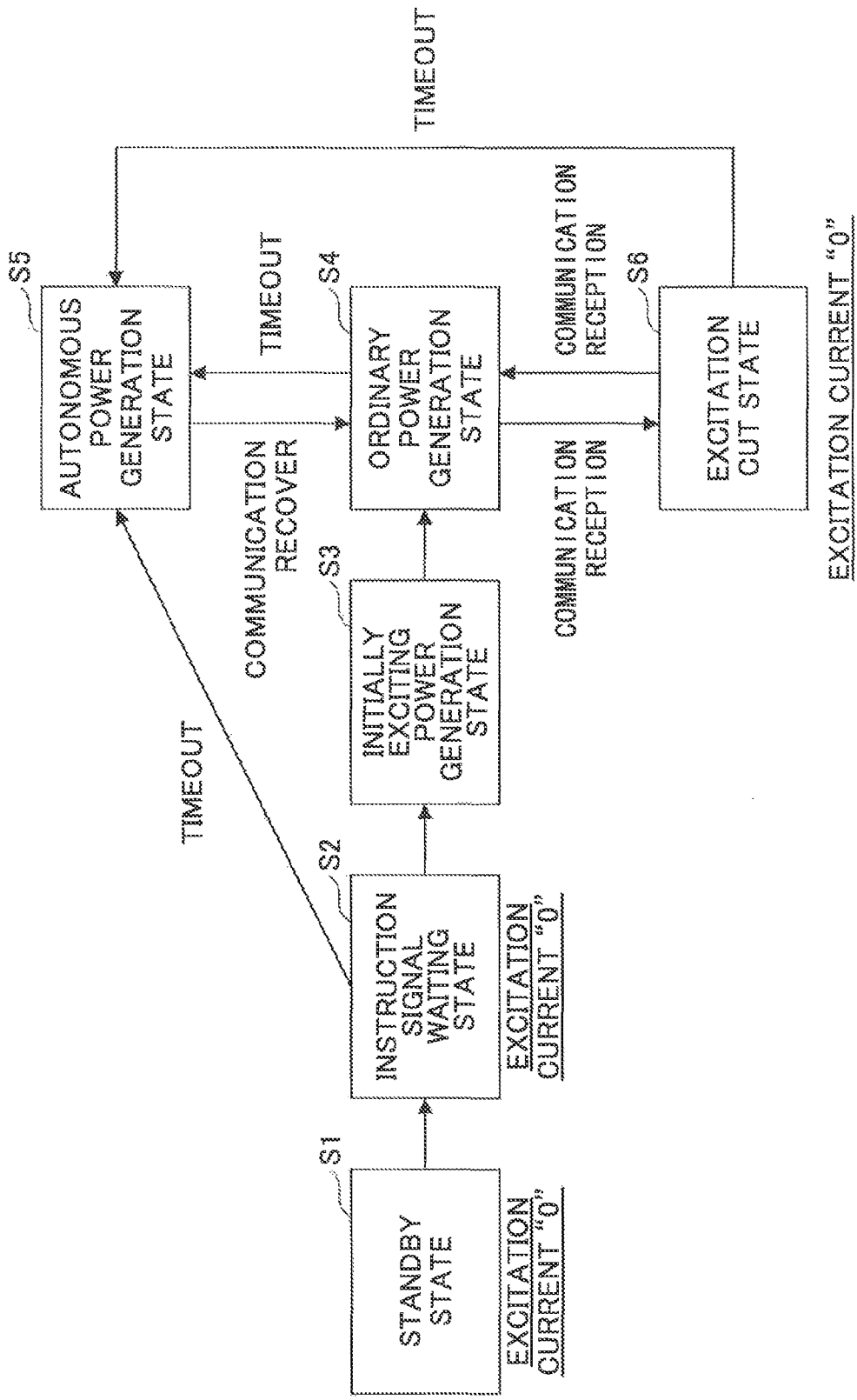
FIG. 2 is a state change diagram of a LIN regulator 20.

FIG. 2 is a state change diagram of the LIN regulator 20.

The LIN regulator 20 includes a standby state S1, an instruction signal waiting state S2, an initially exciting power generation state S3, an ordinary power generation state S4, an autonomous power generation state S5 and an excitation cut state S6, as illustrated in FIG. 2.

In the standby state S1, there is no communication signal on the LIN bus 30, and no excitation current is applied to an excitation coil of the alternator 60 (excitation current=0). The standby state S1 corresponds to a vehicle stop state and a sleeping state of the LIN regulator 20.

The instruction signal waiting state S2 is entered from the standby state S1 to wait for the instruction signal from the ECU 10 via the LIN bus 30, as illustrated in FIG. 2. Also in the instruction signal waiting state S2, no excitation current is applied to the excitation coil of the alternator 60. If a state in which the instruction signal is not received from the ECU 10 continues for a predetermined time (3 s, for example) in the instruction signal waiting state S2, timeout occurs, which causes the transition to the autonomous power generation state S5. It is noted that, before the timeout, the LIN regulator 20 maintains a state (non-power generation state of the alternator 60) in which no excitation current is applied to the excitation coil of the alternator 60.

The initially exciting power generation state S3 is entered from the instruction signal waiting state S2 when the LIN regulator 20 normally receives the instruction signal from the ECU 10 (i.e., the LIN regulator 20 receives the instruction signal, which meets the communication specification, from the ECU 10), as illustrated in FIG. 2. The initially exciting power generation state S3 is a transient state in the course of changing to the ordinary power generation state S4.

The ordinary power generation state S4 is entered from the initially exciting power generation state S3 to perform the power generation of the alternator 60 according to the instruction signal. Specifically, in the ordinary power generation state S4, the LIN regulator 20 controls the excitation current applied to the excitation coil of the alternator 60 such that the instruction value (that causes the generated voltage to be greater than 0) of the instruction signal from the ECU 10 is implemented. Further, in the ordinary power generation state S4, if the LIN regulator 20 receives the instruction signal, which does not meet the communication specification, from the ECU 10, the LIN regulator 20 controls the excitation current applied to the excitation coil of the alternator 60 such that the instruction value of the normal instruction signal received previously is implemented. If a state in which the instruction signal is not received from the ECU 10 (i.e., a state in which the instruction signal from the ECU 10 does not come) continues for a predetermined time (3 s, for example) in the ordinary power generation state S4, timeout occurs, which causes the transition to the autonomous power generation state S5. It is noted that, before the timeout, the LIN regulator 20 maintains the generated state of the alternator 60 based on the instruction value (previous value) of the normal instruction signal received previously. Further, if the instruction value (generated voltage) of the instruction signal from the ECU. 10 is 0 in the ordinary power generation state S4 (i.e., a temporary stop of the alternator 60 is demanded), the excitation cut state S6 is entered.

In the autonomous power generation state S5, the LIN regulator 20 cannot obtain the instruction signal from the ECU 10 due to the communication abnormality, etc., but the LIN regulator 20 autonomously controls the alternator 60 to generate power without relying on the instruction signal from the ECU 10. Specifically, the LIN regulator 20 monitors the rotation of the alternator 60 to perform the power generation control of the alternator 60 in an autonomous mode without relying on the instruction signal (including the previous value) from the ECU 10. In the autonomous power generation state S5, the power generation control may be performed in arbitrary ways. For example, the generated voltage (target value) of the alternator 60 may be a fixed value greater than 0, or may be a varied within a range that is greater than 0 (i.e., a range in which the power is generated).

In the excitation cut state S6, no excitation current is applied to the excitation coil of the alternator 60 due to the fact that the instruction value (generated voltage) of the instruction signal from the ECU 10 is 0 If the instruction value (generated voltage) of the instruction signal from the ECU 10 becomes greater than 0 in the excitation cut state S6, the ordinary power generation state S4 is entered. Further, if the LIN regulator 20 receives the instruction signal, which does not meet the communication specification, from the ECU 10, the LIN regulator 20 maintains a state in which no excitation current is applied to the excitation coil of the alternator 60 (i.e., non-power generation state) based on the instruction value (=0) of the normal instruction signal previously received. If a state in which the instruction signal is not received from the ECU 10 (i.e., a state in which the instruction signal from the ECU 10 does not come) continues for a predetermined time (3 s, for example) in the excitation cut state S6, timeout occurs, which causes the transition to the autonomous power generation state S5. It is noted that, before the timeout, the LIN regulator 20 maintains the non-power generation state of the alternator 60 based on the instruction value (=0) of the normal instruction signal received previously.

Figure 3:
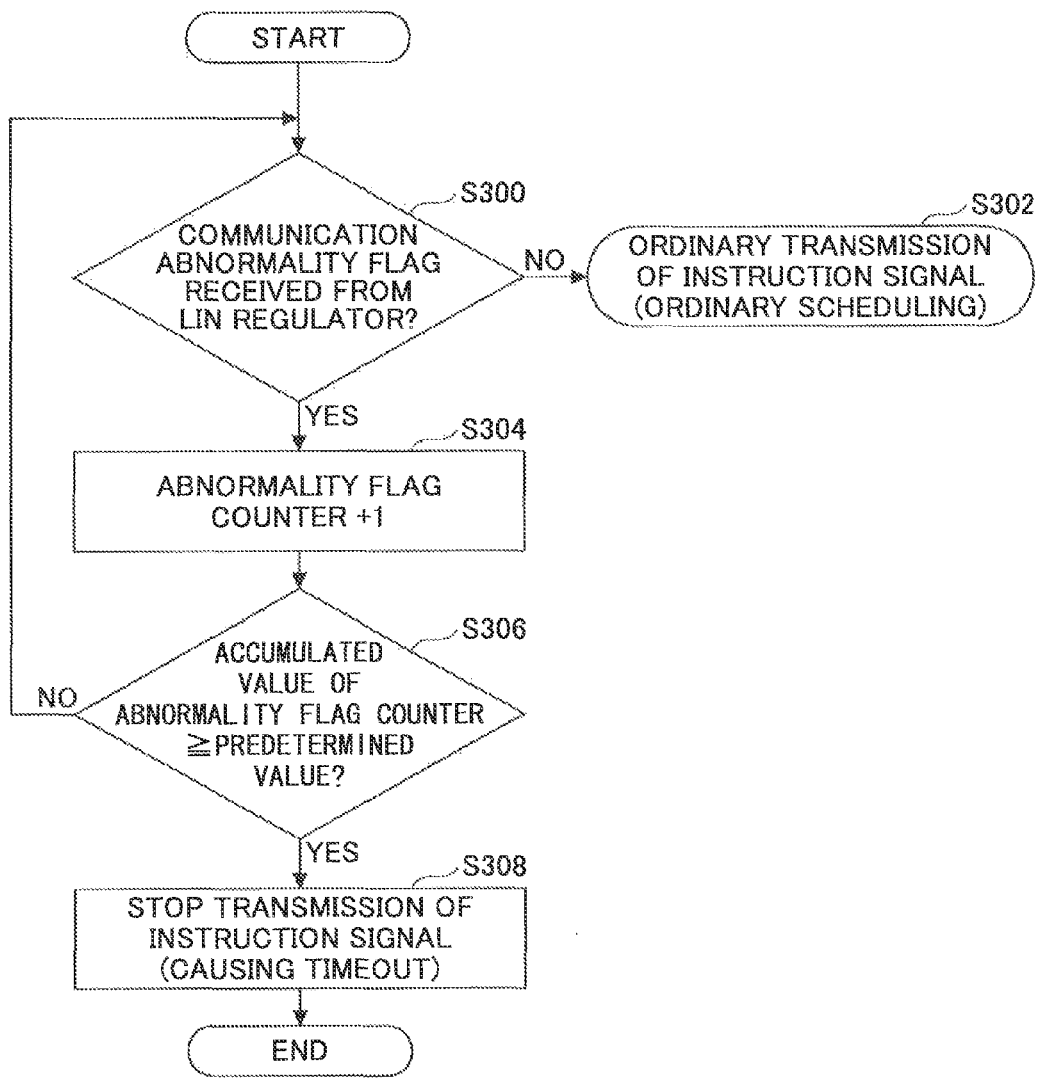
FIG. 3 is an example of a flowchart of a main process (instruction signal stop determination) executed by an ECU 10.

FIG. 3 is an example of a flowchart of a main process (instruction signal stop determination) executed by the ECU 10. It is noted that the process illustrated in FIG. 3 is implemented when the CPU of the ECU 10 executes the use of the LIN communication software resources. The process illustrated in FIG. 3 may be initiated when an ignition switch of the vehicle is turned on, for example. The process illustrated in FIG. 3 may be performed in synchronization with the ordinary transmission cycle (i.e., the first predetermined cycle T1) of the instruction signal, for example. The process illustrated in FIG. 3 may be performed during a period in which the instruction signal is transmitted according to the ordinary scheduling.

In step S300, it is determined whether the ECU 10 receives the communication abnormality flag from the LIN regulator 20. If the ECU 10 receives the communication abnormality flag from the LIN regulator 20, the process routine goes to step S304, and if the ECU 10 does not receive the communication abnormality flag from the LIN regulator 20, the process routine goes to step S302.

In step S302, the state in which the instruction signal is transmitted according to the ordinary scheduling is maintained.

In step 304, an abnormality flag counter is incremented by 1. It is noted that an initial value of the abnormality flag counter may be 0.

In step S306, it is determined whether the value (accumulated value) of the abnormality flag counter is greater than or equal to a predetermined value Th1. The predetermined value Th1 is an arbitrary value greater than 2 in a typical case. Preferably, the predetermined value Th1 may correspond to an upper limit time for which the non power generation state of the alternator 60 (or the state in which the previous value is relied on to perform the control in the ordinary power generation state) is permitted to continue, or correspond to the upper limit time including a margin. The predetermined value Th1 may be varied because the upper limit time for which the non-power generation state of the alternator 60 is permitted to continue changes according to a state of the battery 40 (a SOC: State of Charge, for example), a traveling state of the vehicle, etc. In a simple configuration, the predetermined value Th1 may correspond to a time of 10 s, for example. If the value of the abnormality flag counter is greater than or equal to the predetermined value Th1, the process routine goes to step S308, otherwise (i.e., if the value of the abnormality flag counter is less than the predetermined value Th1) the process routine returns to step S300. In this way, if the communication abnormality flag is received successively more than or equal to a predetermined number of times corresponding to the predetermined value Th1, the process routine goes to step S308. It is noted that, until the process routine goes to step S308, the state in which the instruction signal is transmitted according to the ordinary scheduling is kept.

In step S308, the transmission of the instruction signal is stopped. Specifically, the transmission of the instruction signal, which otherwise is performed at the first predetermined cycle T1, is stopped. If the transmission of the instruction signal is stopped, a state in which the LIN regulator 20 cannot receive the instruction signal is entered. As described above, if a state in which the instruction signal is not received from the ECU 10 (i.e., a state in which the instruction signal from the ECU 10 does not come) continues for a predetermined time (3 s, for example) in the ordinary power generation state S4, timeout occurs in the LIN regulator 20, which causes the transition to the autonomous power generation state S5 (see FIG. 2). In this way, if the ECU 10 successively receives the communication abnormality flag more than or equal to a predetermined number of times, the ECU 10 stops the transmission of the instruction signal to the LIN regulator 20 in order to cause the timeout of the LIN regulator 20 and the transition to the autonomous power generation state. For this reason, the state in which the instruction signal is stopped is continued more than or equal to a predetermined time period that is necessary to cause the timeout. It is noted that the predetermined time period is substantially longer than the first predetermined cycle T1.

According to the process illustrated in FIG. 3, if the ECU 10 successively receives the communication abnormality flag more than or equal to a predetermined number of times that are transmitted from the LIN regulator 20 due to the fact that the instruction signal does not meet the communication specification, the ECU 10 can cause the timeout of the LIN regulator 20 and the transition to the autonomous power generation state. In the ordinary power generation state S4 or the excitation cut state S6, for example, if the instruction signal from the ECU 10 does not meet the communication specification, the LIN regulator 20 continues the operation based on the instruction value of the normal instruction signal previously received from the ECU 10, as described above. The successive generation of the instruction signal, which does not meet the communication specification, causes the operation state, in which the previously instruction value is held and used, to continue. There may be a risk that the continuation of the operation state over a relatively long period causes undesired power generation control. In the excitation cut state S6, in particular, the continuation of the instruction signal, which does not meet the communication specification, over a relatively long period causes the non-power generation state of the alternator 60 over a relatively long period, which may lead to a problem that the voltage of the battery is reduced or the battery goes flat. This also holds true for the instruction signal waiting state S2. In the instruction signal waiting state S2, the continuation of the instruction signal, which does not meet the communication specification, over a relatively long period causes the non-power generation state of the alternator 60 to be maintained over a relatively long period, which may leads to a problem that the voltage of the battery is reduced or the battery goes flat.

In contrast, according to the process illustrated in FIG. 3, if the ECU 10 successively receives the communication abnormality flag from the LIN regulator 20 more than or equal to a predetermined number of times, the ECU 10 can cause the timeout of the LIN regulator 20 and the transition to the autonomous power generation state. Therefore, it becomes possible to appropriately prevent the problem described above (i.e., the problem that the undesired power generation control is continued over a relatively long period). For example, in the excitation cut state 36 or the instruction signal waiting state S2, if the instruction signal, which does not meet the communication specification, is successively received more than or equal to a predetermined number of times, it causes the LIN regulator 20 to operate in the autonomous power generation state, which can prevent the reduction in the voltage of the battery or a dead of the battery. Further, in the ordinary power generation state S4, if the instruction signal, which does not meet the communication specification, is successively received more than or equal to a predetermined number of times, it causes the LIN regulator 20 to operate in the autonomous power generation state, which can prevent the problem due to the fact that the instruction value of the previous normal instruction signal is kept over a relatively long period in the ordinary power generation state S4 (i.e., a state in which there is a great alienation between the instruction value of the previous normal instruction signal and an originally expected instruction value continues over a relatively long period).

It is noted that, in the process illustrated in FIG. 3, when the process of step S308 causes the timeout of the LIN regulator 20 and the transition to the autonomous power generation state S5, the ECU 10 may keep a state in which the transmission of the instruction signal is stopped. Alternatively, considering that there is a case where the instruction signal does not temporarily meet the communication specification (i.e., not a permanent abnormality), the ECU 10 may change to a state (i.e., determination state to return to the ordinary power generation state) in which the ECU 10 tries to restore the ordinary power generation state S4 (see FIG. 2) of the LIN regulator 20.

Figure 4:
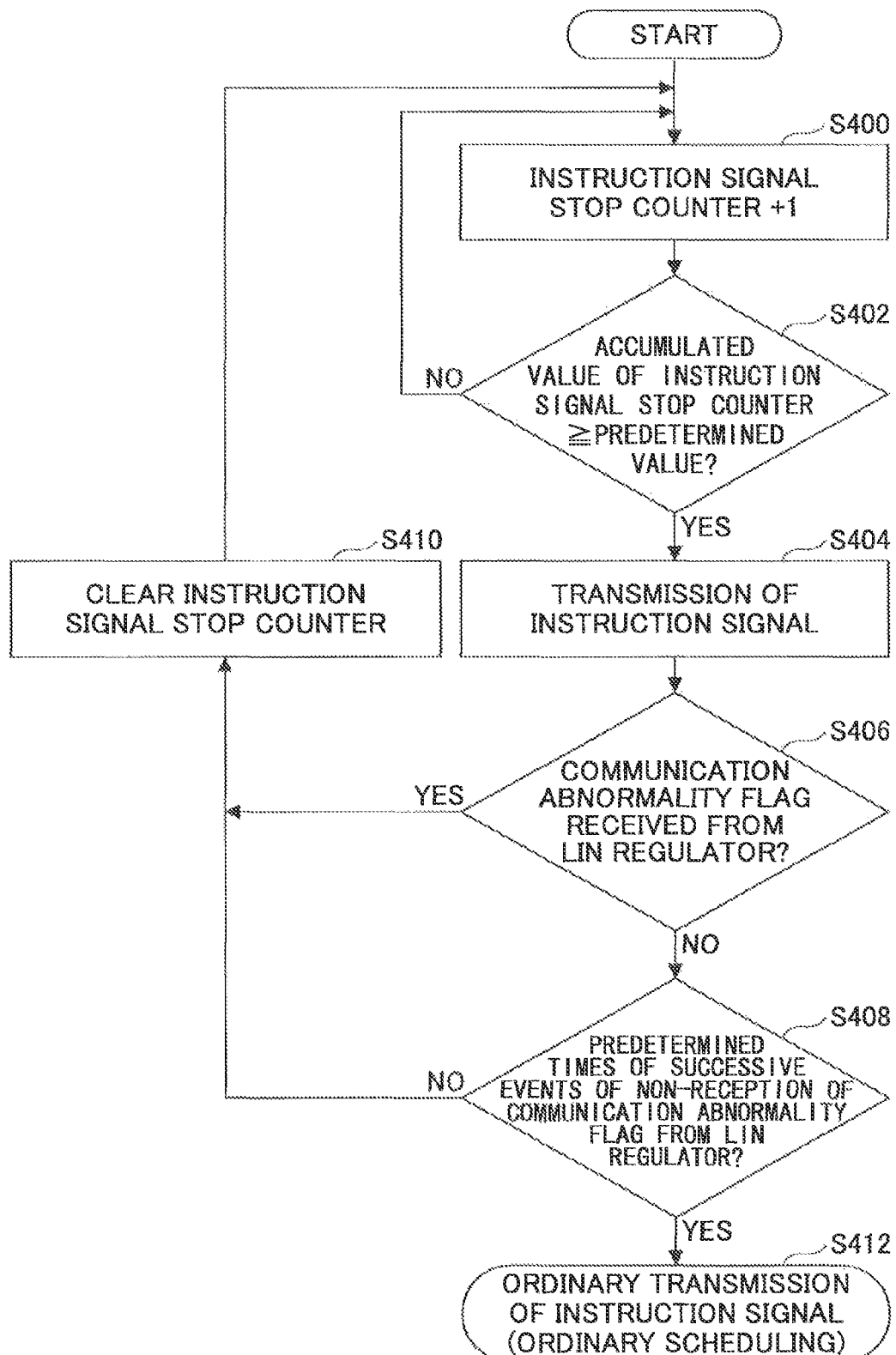
FIG. 4 is an example of a flowchart of a return process executed by an ECU 10.

FIG. 4 is an example of a flowchart of a main process (return process) executed by the ECU 10 in the determination state to return to the ordinary power generation state. The process illustrated in FIG. 4 may be implemented when the CPU of the ECU 10 executes using the LIN communication software resources. The process illustrated in FIG. 4 may be performed after the process of step S308 illustrated in FIG. 3 causes the transition to the autonomous power generation state S5 of the LIN regulator 20.

In step 400, an instruction signal stop counter is incremented by 1. It is noted that an initial value of the instruction signal stop counter may be 0.

In step S402, it is determined whether the value (accumulated value) of the instruction signal stop counter is greater than or equal to a predetermined value Th2. The predetermined value Th2 corresponds to the second predetermined cycle T2, and may be an arbitrary value that is greater than or equal to 1. The smaller the predetermined value Th2 becomes, the shorter the time from a time point when the instruction signal comes to meet the communication specification to a time point of the return to the ordinary power generation state becomes, but the lower the process efficiency becomes if the instruction signal does not meet the communication specification permanently or over a substantially long time period. In terms of this, the predetermined value Th2 may be set such that the second predetermined cycle T2 is within a range from 10 s to 20 s, for example. In step S402, if the value of the instruction signal stop counter is greater than or equal to the predetermined value Th2, the process routine goes to step S404, otherwise (i.e., if the value of the instruction signal stop counter is less than the predetermined value Th2) the process routine returns to step S400.

In step S404, the instruction signal is transmitted to the LIN regulator 20. In this way, when the value of the instruction signal stop counter becomes equal to the predetermined value Th2 (i.e., after a lapse of time corresponding to the second predetermined cycle T2), the instruction signal from the ECU 10 is transmitted to the LIN regulator 20. If the LIN regulator 20 receives the instruction signal and the instruction signal does not meet the communication specification, the LIN regulator 20 transmits the communication abnormality flag to the ECU 10, as described above. Thus, if a state in which the instruction signal meets the communication specification does not continue, the autonomous power generation state S5 is maintained until the state in which the instruction signal meets the communication specification continues (or another termination condition is met). On the other hand, if the instruction signal meets the communication specification, the LIN regulator 20 performs the control of the alternator 60 based on the instruction value of the instruction signal (i.e., returns to the ordinary power generation state S4).

In step S406, it is determined whether the communication abnormality flag is received as the response signal from the LIN regulator 20 in response to the instruction signal transmitted in step S404. If the communication abnormality flag is received from the LIN regulator 20, the process routine returns to step S400 via step S410. On the other hand, If the communication abnormality flag is ti received from the LIN regulator 20, the process routine goes to step S408.

In step S408, it is determined whether a non-reception event of the communication abnormality flag from the LIN regulator 20 occurs successively a predetermined number of times. In other words, it is determined whether the communication abnormality flag is not received from the LIN regulator 20 in responses to the successive transmissions of the instruction signal (step S404) at the predetermined number of times. The predetermined number of times may be arbitrary as long as it is greater than or equal to 1. If the non-reception event of the communication abnormality flag from the LIN regulator 20 occurs successively the predetermined number of times, the process routine goes to step S412, otherwise (i.e., if the non-reception event of the communication abnormality flag from the LIN regulator 20 does not occur successively the predetermined number of times) the process routine returns to step S400 via step S410.

In step S410, the instruction signal stop counter is cleared. In other words, the instruction signal stop counter is reset to 0. The process routine returns to step S400 after the process of step S410. In this way, if the state in which the instruction signal meets the communication specification does not continue, the instruction signal is repeatedly transmitted to the LIN regulator 20 at the second predetermined cycle T2 until the state in which the instruction signal meets the communication specification continues (or another termination condition is met).

In step S412, the state in which the instruction signal is transmitted according to the ordinary scheduling is entered. In other words, the ECU 10 returns to the state in which the ECU 10 transmits the instruction signal according to the ordinary scheduling. With this arrangement, in the ordinary power generation state S4, the LIN regulator 20 performs the control of the alternator 60 based on the instruction value of the instruction signal transmitted at the first predetermined cycle T1.

According to the process illustrated in FIG. 4, even if the process of step S408 illustrated in FIG. 3 causes the transition of the LIN regulator 20 to the autonomous power generation state S5, the instruction signal is transmitted to the LIN regulator 20 at the second predetermined cycle T2 after that, which enables the transition of the LIN regulator 20 to the ordinary power generation state S4 when the instruction signal meets the communication specification. With this arrangement, if the instruction signal does not meet the communication specification temporarily, it becomes possible to return to the ordinary power generation state S4 when the instruction signal comes to meet the communication specification while operating in the autonomous power generation state so as to prevent a dead of the battery, etc.

According to the alternator control apparatus 1 of this embodiment, the following effect among others can be obtained.

As described above, even if a state in which the instruction signal from the ECU 10 does not meet the communication specification, and the LIN regulator 20 cannot receive the normal instruction signal from the ECU 10, it is prevented that the non-power generation state of the alternator 60 (or the state in which the previous value is relied on to perform the control in the ordinary power generation state) continues over an undesired time period. Thus, it becomes possible to implement a highly robust control logic that does not cause the problems such as a dead of the battery.

Here, according to the embodiment described above, stopping the instruction signal from the ECU 10 to the LIN regulator 20 which otherwise is transmitted at the first predetermined cycle causes the timeout of the LIN regulator 20, which prevents the non power generation state of the alternator 60 (or the state in which the previous value is relied on to perform the control in the ordinary power generation state) from continuing for a long time. In contrast, such a comparative embodiment can be contemplated, in which, instead of stopping the instruction signal from the ECU 10 to the LIN regulator, the LIN regulator has a function of automatically changing to the autonomous power generation state S5 such that the LIN regulator rejects the instruction signal from the ECU 10 after the instruction signal from the ECU 10 does not meet the communication specification successively. However, because such a function does not exist in a regulator specification which Verband der Deutschen Automobilindustrie (VDA) promotes to unify, the LIN regulator that does not comply with such a regulator specification becomes necessary. In contrast, according to the embodiment, it becomes possible to implement a highly robust control logic that does not cause the problems such as the dead of battery, while using the LIN regulator 20 that complies with the regulator specification which Verband der Deutschen Automobilindustrie (VDA) promotes to unify and thus has high versatility.

The present invention is disclosed with reference to the preferred embodiments. However, it should be understood that the present invention is not limited to the above-described embodiments, and variations and modifications may be made without departing from the scope of the present invention.

For example, according to the embodiment described above, although the LIN is used as a vehicle-installed LAN, other vehicle-installed LANs are also applicable.

DESCRIPTION OF REFERENCE SYMBOLS

10 ECU
20 LIN regulator
30 LIN bus
40 battery
50 electric loads
60 alternator

The invention claimed is:
1. An alternator control apparatus comprising:
a first controller that controls an alternator; and
a second controller that transmits an instruction signal to the first controller at a first predetermined cycle, the instruction signal being related to electric power generation of the alternator, wherein
the first controller controls the alternator such that an amount of the electric power generated by the alternator is greater than 0, if the first controller does not receive the instruction signal from the second controller over a predetermined time period that is longer than the first predetermined cycle,
the second controller stops transmitting the instruction signal over the predetermined time period, if the second controller determines that the instruction signal from the second controller is received at the first controller as an abnormal instruction signal that does not meet a predetermined communication specification,
the first controller includes a first mode in which the first controller controls the alternator based on the instruction signal from the second controller, and a second mode in which the first controller controls the alternator, without relying on the instruction signal, such that the amount of the electric power generated by the alternator is greater than 0,
the first controller is configured to transmit an abnormality report signal, which represents the abnormality of the instruction signal, to the second controller, if the first controller determines the instruction signal from the second controller to be the abnormal instruction signal that does not meet the predetermined communication specification, the first controller, in the first mode, controls the alternator based on the instruction signal that has been received prior to the abnormal instruction signal, if the instruction signal received from the second controller is the abnormal instruction signal, the first controller, in the first mode, changes to the second mode, if the first controller does not receive the instruction signal from the second controller over the predetermined time period, and the second controller stops transmitting the instruction signal over the predetermined time period, if the second controller continuously receives the abnormality report signal from the first controller.

2. The alternator control apparatus of claim 1, wherein the first controller, in the second mode, changes to the first mode, if the first controller receives the instruction signal, which meets the predetermined communication specification, from the second controller, and the second controller transmits the instruction signal to the first controller at a second predetermined cycle, after the second controller stops transmitting the instruction signal over the predetermined time period.

3. The alternator control apparatus of claim 2, wherein the second predetermined cycle is longer than the first predetermined cycle.

4. The alternator control apparatus of claim 3, wherein the second controller transmits the instruction signal at the first predetermined cycle, if the second controller does not receive the abnormality report signal with respect to the instruction signal transmitted at the second predetermined cycle.

5. The alternator control apparatus of claim 2, wherein the first controller is a regulator that complies with a LIN (Local Interconnect Network) protocol, and the first controller and the second controller communicate with each other based on the LIN protocol.

6. An alternator control apparatus comprising:
a first controller that controls an alternator; and
a second controller that transmits an instruction signal to the first controller at a first predetermined cycle, the instruction signal being related to electric power generation of the alternator, wherein the first controller controls the alternator such that an amount of the electric power generated by the alternator is greater than 0, if the first controller does not receive the instruction signal from the second controller over a predetermined time period that is longer than the first predetermined cycle, the second controller stops transmitting the instruction signal over the predetermined time period, if the second controller determines that the instruction signal from the second controller is received at the first controller as an abnormal instruction signal that does not meet a predetermined communication specification, the first controller includes a waiting mode in which the first controller waits for the instruction signal from the second controller, a first mode in which the first controller controls the alternator based on the instruction signal from the second controller, and a second mode in which the first controller controls the alternator, without relying on the instruction signal, such that the amount of the electric power generated by the alternator is greater than 0, the first controller is configured to transmit an abnormality report signal, which represents the abnormality of the instruction signal, to the second controller, if the first controller determines the instruction signal from the second controller to be the abnormal instruction signal that does not meet the predetermined communication specification, the first controller, in the waiting mode, maintains the amount of the electric power generated by the alternator at 0, if the instruction signal received from the second controller is the abnormal instruction signal, the first controller, in the waiting mode, changes to the second mode, if the first controller does not receive the instruction signal from the second controller over the predetermined time period, and the second controller stops transmitting the instruction signal over the predetermined time period, if the second controller continuously receives the abnormality report signal from the first controller.

7. The alternator control apparatus of claim 6, wherein the first controller, in the waiting mode, changes to the first mode, if the first controller receives the instruction signal, which meets the predetermined communication specification, from the second controller, the second controller transmits the instruction signal to the first controller at a second predetermined cycle, after the second controller stops transmitting the instruction signal over the predetermined time period.

8. The alternator control apparatus of claim 7, wherein the second predetermined cycle is longer than the first predetermined cycle.

9. The alternator control apparatus of claim 6, wherein the first controller is a regulator that complies with a LIN (Local Interconnect Network) protocol, and the first controller and the second controller communicate with each other based on the LIN protocol.

* * * * *